Feb. 11, 1969
D. L. CUMMINS ET AL  3,427,529
POTENTIAL REGULATOR CIRCUIT
Filed Oct. 3, 1966
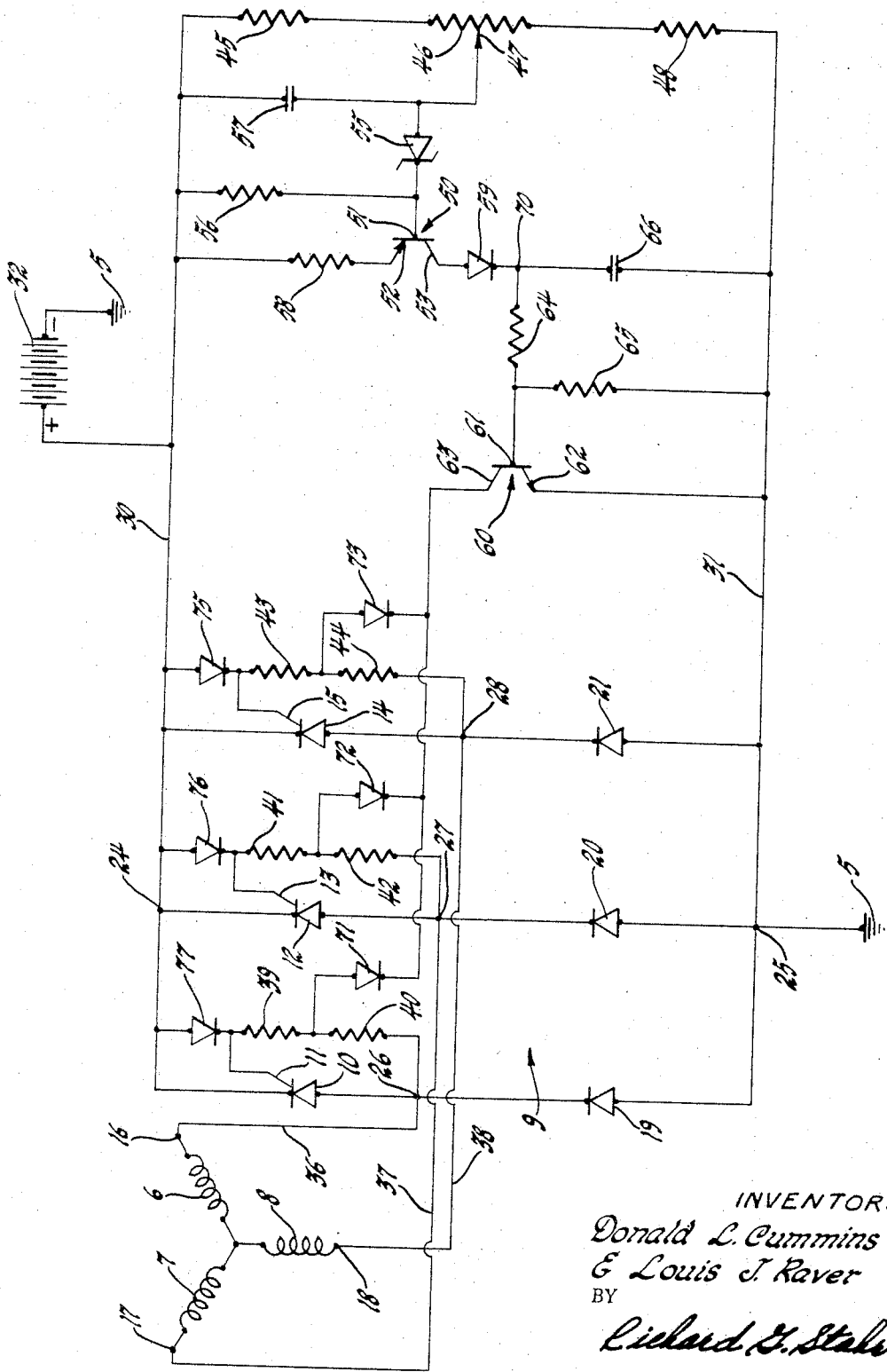
INVENTORS
*Donald L. Cummins*
*& Louis J. Raver*
BY
*Richard L. Stahl*
ATTORNEY

United States Patent Office 3,427,529
Patented Feb. 11, 1969

3,427,529
POTENTIAL REGULATOR CIRCUIT
Donald L. Cummins and Louis J. Raver, Anderson, Ind.,
assignors to General Motors Corporation, Detroit,
Mich., a corporation of Delaware
Filed Oct. 3, 1966, Ser. No. 583,588
U.S. Cl. 321—18                    3 Claims
Int. Cl. H02m 1/08, 7/52

ABSTRACT OF THE DISCLOSURE

A potential regulator circuit for use with permanent magnet type alternators wherein the positive polarity bank of a full wave bridge type rectifier includes a silicon controlled rectifier device corresponding to each phase of the generated potential. Each alternator output winding is connected to the control electrode of a respective silicon controlled rectifier in the rectifier circuit. A potential sensitive circuit arrangement provides a switching signal to render a switching transistor conductive which diverts the alternator output potential from the control electrodes of the silicon controlled rectifiers to the opposite side of the direct current output line.

---

The present invention relates to potential regulator circuits and more specifically, to a potential regulator circuit suitable for use with permanent magnet type alternators.

With dynamoelectric machines which depend upon current flowing through a field coil or winding for producing the necessary magnetic field, it is a common expedient to alter the amount of current flowing through the field coil in response to changes of system potential magnitude for purposes of regulating the output potential of the machine. Permanent magnet type alternators, however, present a different regulating problem in that permanent magnet units provide the necessary magnetic field, therefore, machines of this type are not adaptable to potential regulator circuits or arrangements which operate to alter field coil current.

As alternators of the permanent magnet type offer certain advantages from the standpoint of cost and reliability over the field coil type, the requirement of a reliable and inexpensive potential regulator circuit or arrangement suitable for use with dynamoelectric machines of the permanent magnet type, is apparent.

It is, therefore, an object of this invention to provide an improved potential regulator circuit.

It is another object of this invention to provide an improved potential regulator circuit suitable for use with permanent magnet type alternators.

In accordance with this invention, a potential regulator circuit suitable for use with permanent magnet type alternators is provided in combination with a generating system rectifier circuit including at least one controllable unidirectional current translating device having two current carrying electrodes and a control electrode of the type which may be triggered conductive upon the application of a control signal to the control electrode thereof wherein the generated alternating current potential which is normally applied to the control electrode of each controllable unidirectional current translating device included in the system rectifier circuit is diverted away from each control electrode by a switching arrangement which is responsive to an electrical signal produced by a potential sensitive circuit arrangement when the system potential exceeds a predetermined maximum.

For a better understanding of the present invention, together with additional objects, advantages and features thereof, reference is made to the following description and accompanying single figure drawing in which an embodiment of the regulator circuit of this invention is schematically set forth.

For purposes of illustrating the features of the novel regulating circuit of this invention and without intention or inference of a limitation thereto, the circuit will be described in combination with a three phase permanent magnet type alternator. The alternating current output coils of a three phase permanent magnet type alternator are schematically illustrated in the figure as Y-connected stator coils 6, 7 and 8 which also may be connected in a delta configuration. A magnetic field produced by a permanent magnet or magnets, not shown, moves relative to these coils and generates a three phase potential therein in a manner well known in the art.

To convert the three phase alternating current potential generated in coils 6, 7 and 8 to a rectified direct current system potential, a rectifier circuit, generally shown at 9, is provided. In the figure, rectifier circuit 9 is illustrated as a three phase bridge type full wave rectifier circuit having three controllable unidirectional current translating devices, each having two current carrying electrodes and a control electrode of the type which may be triggered conductive upon the application of a control signal of proper polarity to the control electrode thereof, in the positive polarity bank and three conventional unidirectional current translating devices in the negative polarity bank. Without intention or inference of a limitation thereto, the controllable unidirectional current translating devices have been illustrated in the figure as silicon controlled rectifiers 10, 12 and 14 having respective control electrodes 11, 13 and 15 and the conventional unidirectional current translating devices have been illustrated as conventional diodes 19, 20 and 21. It is to be specifically understood that alternate devices having similar electrical characteristics may be substituted for silicon controlled rectifiers 10, 12 and 14 without departing from the spirit of the invention.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered conductive upon the application to the control electrode of a control signal of a polarity which is positive with respect to the potential present upon the cathode electrode and of sufficient magnitude to produce control electrode-cathode current. In the conducting state, the silicon controlled rectifier will conduct current in one direction and retains the ability to block current flow in the opposite direction. In the conducting state, therefore, the silicon controlled rectifier functions as a conventional diode. To extinguish a conducting silicon controlled rectifier, the anode-cathode circuit may be interrupted or the polarity of the potential applied across the anode-cathode electrodes may be reversed.

The alternating current potential generated in stator coils 6, 7 and 8 appears across the alternator alternating current output circuitry, which may be respective terminals 16, 17 and 18 or any other electrical device or arrangement which provides for an electrical connection to external circuitry. Stator coils 6, 7 and 8 are connected to respective alternating current input circuit terminals or junctions 26, 27 and 28 of rectifier circuit 9 through respective alternating current output circuit terminals 16, 17 and 18 and leads 36, 37 and 38.

The three phase alternating current potential generated in stator coils 6, 7 and 8 is full wave rectified by rectifier circuit 9 and appears as system potential across positive polarity junction 24 and negative polarity junction 25, which may be terminals or any suitable electrical device or arrangement which provides for an electrical connection to external circuitry, of rectifier circuit 9. Positive polarity junction 24 may be connected to positive polarity line 30 and negative polarity junction 25 may be connected to point of reference or ground potential 5 which, since it is the same point electrically throughout the system, has been referenced by the same numeral throughout the figure. The system potential may be employed to charge a conventional storage battery 32 connected across the system output circuitry comprising positive polarity line 30 and point of reference or ground potential 5 and poled as shown.

To supply the control signal necessary for triggering silicon controlled rectifiers 10, 12 and 14 conductive, the generated alternating current potential may be employed. Therefore, each of the alternating current output circuit terminals may be connected to the control electrode of a respective one of the controllable unidirectional current translating devices included in rectifier circuit 9. Control electrode 11 of silicon controlled rectifier 10 is connected to alternating current output terminal 16 through series resistors 39 and 40 and lead 36, control electrode 13 of silicon controlled rectifier 12 is connected to alternating current output terminal 17 through series resistors 41 and 42 and lead 37 and control electrode 15 of silicon controlled rectifier 14 is connected to alternating current output terminal 18 through series resistors 43 and 44 and lead 38.

To produce an electrical signal in response to system potential exceeding a predetermined maximum, a potential sensitive circuit arrangement is connected across the system output circuitry. The potential sensitive circuit arrangement includes a potential divider network comprising resistor 45, potentiometer 46 having a movable contact 47 and resistor 48, a type PNP transistor 50 having a base electrode 51, an emitter electrode 52 and a collector electrode 53, and a Zener diode 55. An alternate transistor type may also be employed with compatible electrical polarities.

The parallel combination of the potential divider network, resistor 45, potentiometer 46 and resistor 48, and the current carrying electrodes, emitter electrode 52 and collector electrode 53, of type PNP transistor 50 of the potential sensitive circuitry is connected across positive polarity line 30 and point of reference or ground potential 5 and Zener diode 55 is connected between movable contact 47 of potentiometer 46 and base electrode 51 of transistor 50 and reverse poled. Resistor 56 is a base bias resistor, capacitor 57 is a filter capacitor and resistor 58 is a feedback resistor, the purpose of which will be brought out later in this specification.

As the emitter electrode 52 of type PNP transistor 50 is connected to the positive polarity direct current output terminal 24 of rectifier circuit 9 through feedback resistor 58 and positive polarity line 30 and the collector electrode 53 thereof is connected to the negative polarity direct current output terminal 25 of rectifier circuit 9 through diode 59, resistor 64, resistor 65 and point of reference or ground potential 5, this type PNP transistor is forward poled.

To divert the generated potential appearing across the alternating current output circuitry of the alternator away from the control electrode of each controllable unidirectional current translating device included in the rectifier circuit when system potential exceeds a predetermined maximum, a switching arrangement which is responsive to the electrical signal produced by the potential sensitive circuitry, in a manner to be later explained, is provided.

This circuitry includes type NPN switching transistor 60 having a base electrode 61, an emitter electrode 62 and a collector electrode 63. An alternate transistor type may also be employed with compatible electrical polarities. The alternating current output circuit terminals 16, 17 and 18 of the alternator are connected in parallel through respective diodes 71, 72 and 73 and in series with the current carrying electrodes, collector electrode 63 and emitter electrode 62 of switching transistor 60 to the negative polarity line 31 of the system output circuitry.

It is to be specifically understood that the control signal diverting circuit is not to be limited to this specific connection. With other generating systems in which alternate controllable unidirectional current translating devices are employed in the rectifier circuit or in which an alternate type switching transistor is employed, the generated potential may be diverted to the other polarity line of the system output circuitry or to a separate point of reference or ground potential.

The electrical signal produced by the potential sensitive circuitry, in a manner to be later explained, is applied to the control electrode, base electrode 61, of switching transistor 60 through an R-C filter network comprising resistor 64 and capacitor 66 which filters the electrical signal produced by the potential sensitive network to which switching transistor 60 is responsive. Diode 59 prevents feedback of the discharge of capacitor 66 into the collector electrode of transistor 50.

In operation, system potential appears across the potential divider network of the potential sensitive circuitry and a proportional amount of system potential, as determined by the setting of movable contact 47 of potentiometer 46, is applied, in a reverse polarity relationship, across Zener diode 55 through the emitter-base junction of transistor 50.

The maximum system potential, as determined by the external electrical circuitry or components with which the potential generating system is to be employed, is selected. Zener diode 55 is selected to have an inverse breakdown potential rating substantially equal to that proportion of th system potential which appears hereacross, as determined by the setting of movable contact 47 of potentiometer 46, with the system potential across the potential divider network being substantially equal to the selected predetermined maximum.

The regulating circuit arrangement of this invention regulates the system potential of generating systems employing permanent magnet type alternators in a manner now to be explained.

Assuming that the magnitude of the system potential appearing across positive polarity line 30 and point of reference or ground potential 5 remains substantially equal to or less than the selected predetermined maximum, Zener diode 55 remains nonconductive and interrupts the emitter-base circuit of transistor 50, therefore, this device is normally not conducting.

With transistor 50 not conducting, the base-emitter circuit of switching transistor 60 is interrupted, therefore, this device is also normally not conducting.

As an alternating current potential is induced in each of stator coils 6, 7 and 8, the potential of the terminal end of each of these coils passes through positive and negative polarity excursions, with respect to point of reference or ground potential 5, during each induced alternating current potential cycle. The positive polarity potential of the terminal end of each of stator coils 6, 7 and 8 during each induced potential cycle forward poles the corresponding silicon controlled rectifier included in rectifier circuit 9 and is applied as a positive polarity control signal to the control electrode thereof through the series resistors previously described. Therefore, each of the silicon controlled rectifiers included in rectifier circuit 9 is triggered conductive as it becomes forward poled during each positive polarity excursion of the potential of the terminal end of the corresponding stator coil and is extinguished as it becomes reverse poled during each negative polarity excursion of the potential of the terminal end of the corresponding stator coil.

While silicon controlled rectifiers 10, 12 and 14 are triggered conductive as each becomes forward poled during each positive polarity excursion of the potential of the terminal end of the corresponding stator coil, the alternating current potential generated in stator coils 6, 7 and 8 is full wave rectified and appears as a direct current system potential across the output circuitry of the system.

Should the magnitude of the system potential appearing across positive polarity line 30 and negative polarity line 31 increase above the predetermined maximum, Zener diode 55 breaks down and conducts in a reverse direction to complete a circuit for the flow of current through the emitter-base junction of transistor 50, thereby triggering this device to conduction. With transistor 50 conducting, substantially full system potential appears as a positive polarity electrical signal at junction 70. Resistor 58 provides a feedback circuit which slows the operation of the potential sensitive circuitry to prevent ripple control should battery 32 become disconnected or the circuit be operated without a battery.

The electrical signal appearing at junction 70 is filtered by the R-C network comprising resistor 64 and capacitor 66 and is applied to the base electrode 61 of type NPN transistor 60. As this electrical signal is of a positive polarity at junction 70, it is of the proper polarity to produce base-emitter current flow through type NPN switching transistor 60.

As the terminal end of each stator coils 6, 7 and 8 are connected in parallel through respective diodes 71, 72 and 73 to collector electrode 63 of type NPN switching transistor 60 and the emitter electrode 62 thereof is connected to the negative polarity line 31, type NPN switching transistor 60 is normally forwarded poled. Upon the appearance of the electrical signal at junction 70, therefore, this device conducts.

With transistor 60 conducting, the positive polarity control signal normally applied to each of control electrodes 11, 13 and 15 of respective silicon controlled rectifier 10, 12 and 14 as the potential of the terminal end of the corresponding stator coil passes through the positive polarity excursion during each induced potential cycle is diverted through diodes 71, 72 or 73 and the collector-emitter electrodes of switching transistor 60 to the negative polarity line 31 of the system output circuit. Therefore, with transistor 60 conducting, silicon controlled rectifiers 10, 12 and 14 are not triggered conductive and the system potential appearing across positive polarity line 30 and negative polarity line 31 reduces in magnitude.

When the magnitude of the system potential has decreased below the selected predetermined maximum, Zener diode 55 ceases to conduct, thereby interrupting the circuit which provides emitter-base current flow through transistor 50, a condition which quickly extinguishes this device. With transistor 50 extinguished, the electrical signal is removed from the base electrode 61 of switching transistor 60, a condition which quickly extinguishes this device.

With transistor 60 extinguished, silicon controlled rectifiers 10, 12 and 14 are again triggered conductive as each becomes forward poled as the potential of the terminal end of the corresponding stator coil passes through each positive polarity excursion of each induced alternating current potential cycle and the system again operates in the normal manner.

In the novel potential regulator circuit set forth in the figure, diodes 75, 76 and 77 are included for the purpose of shunting the negative potential appearing upon the control electrodes of the respective silicon controlled rectifiers during the negative polarity excursions of the potential of the terminal end of the corresponding coils.

This invention has been described in reference to the full wave rectification of a three phase alternating current potential generated by a permanent magnet type alternator. It is to be specifically understood that the novel circuit of this invention is equally applicable for use with field coil type alternators and with full or half-wave rectification of more or less alternating current phases and is not to be construed as limited to the specific embodiment set forth in the figure. With half wave rectification, of course, fewer unidirectional current translating devices are required in the rectifier circuitry and with more or less phases, more or less unidirectional current translating devices may be required. In fact, the regulating arrangement of this invention may be employed with a half wave rectifier circuit employing only a single controllable unidirectional current translating device having electrical characteristics similar to that of the silicon controlled rectifier illustrated in the figure.

While a preferred embodiment of the present invention has been shown and described, it will be obvious to those skilled in the art that various modifications and substitutions may be made without departing from the spirit of the invention which is to be limited only within the scope of the appended claims.

We claim:

1. A potential regulator circuit for regulating the system potential of an electrical generating system employing an alternator having alternating current output circuit means across which the generated alternating current potential appears comprising, a rectifier circuit including at least one controllable unidirectional current translating device having two current carrying electrodes and a control electrode of the type which may be triggered conductive upon the application of a control signal to the control electrode thereof for rectifying the output potential of said alternator, system output circuit means across which system potential appears, at least one resistor connected between each said alternating current output circuit means and the said control electrode of a respective one of said controllable unidirectional current translating devices included in said rectifier circuit, a potential sensitive circuit means connected across said system output circuit means for producing an electrical signal in response to overpotential conditions and switching circuit means responsive to said electrical signal for establishing an electrical circuit through which the generated potential appearing across said alternating current output circuit means is diverted away from said control electrode of each of said controllable unidirectional current translating devices when said system potential exceeds a predetermined maximum.

2. A potential regulator circuit for regulating the system potential of an electrical generating system employing an alternator having alternating current output circuit means across which the generated alternating current potential appears comprising, a rectifier circuit including at least one controllable unidirectional current translating device having two current carrying electrodes and a control electrode of the type which may be triggered conductive upon the application of a control signal to the control electrode thereof for rectifying the output potential of said alternator, system output circuit means across which system potential appears, means for connecting the series combination of at least two resistors between each of said alternating current output circuit means and the said control electrode of a respective one of said controllable unidirectional current translating devices included in said rectifier circuit, a potential sensitive circuit means connected across said system output circuit means for producing an electrical signal in response to overpotential conditions, a transistor having two current carrying electrodes and a base electrode, means for connecting each of said alternating current output circuit means in parallel through respective diodes and in series with said current carrying electrodes of said transistor device to a selected one polarity line of said system output circuit means and means for applying said electrical signal across said base electrode and one of said current carrying electrodes of said transistor device.

3. A potential regulator circuit as defined in claim 2 wherein each said controllable unidirectional current translating device included in said rectifier circuit is a silicon controlled rectifier.

References Cited

UNITED STATES PATENTS

| | | | |
|---|---|---|---|
| 3,230,442 | 1/1966 | Korda | 322—28 |
| 3,230,443 | 1/1966 | Hallidy | 322—28 |
| 3,300,704 | 1/1967 | McMillen | 320—61 |
| 3,315,141 | 4/1967 | Wright et al. | 320—59 |
| 3,329,883 | 7/1967 | Frierdich | 321—5 |
| 3,364,411 | 1/1968 | Wright | 322—28 XR |

JOHN F. COUCH, *Primary Examiner.*

W. M. SHOOP, *Assistant Examiner.N*

U.S. Cl. X.R.

320—40; 322—28